United States Patent
Holman

(10) Patent No.: US 7,017,923 B1
(45) Date of Patent: Mar. 28, 2006

(54) SPORT WAGON BENCH

(75) Inventor: Robert Alan Holman, 621 Red Ash Cir., Mesquite, TX (US) 75150

(73) Assignee: Robert Alan Holman, Mesquite, TX (US)

( * ) Notice: Subject to any disclaimer, the term of this patent is extended or adjusted under 35 U.S.C. 154(b) by 121 days.

(21) Appl. No.: 10/838,492

(22) Filed: May 4, 2004

(51) Int. Cl.
*B62B 9/00* (2006.01)

(52) U.S. Cl. .............. 280/87.01; 280/47.34; 280/79.11; 280/87.01; 280/87.021

(58) Field of Classification Search ......... 280/87.01, 280/30, 79.11, 79.2, 651, 35
See application file for complete search history.

(56) References Cited

U.S. PATENT DOCUMENTS

| | | | |
|---|---|---|---|
| 5,249,823 A * | 10/1993 | McCoy et al. ............ 280/656 |
| D382,309 S | 8/1997 | Brown et al. |
| 5,957,482 A * | 9/1999 | Shorter ................... 280/639 |
| D466,953 S | 12/2002 | Ortiz |
| 6,536,796 B1 * | 3/2003 | Solomon .................. 280/651 |
| 6,641,149 B1 * | 11/2003 | Chiappetta et al. ...... 280/87.01 |
| 6,802,516 B1 * | 10/2004 | Schuerman et al. ... 280/47.371 |
| 2003/0038440 A1 | 2/2003 | Chiappetta et al. |

* cited by examiner

*Primary Examiner*—Christopher P. Ellis
*Assistant Examiner*—Cynthia F. Collado

(57) ABSTRACT

A machine or wagon for carrying, holding and transporting articles that also can be transformed into a bench for sitting. With a rectangular base, four wheels mounted on the bottom of the base, two of the four wheels are pivotal with a handle attached to pull and steer the wagon. Two removable wagon walls that mount on the rectangular base, each removable wagon wall mounts on one side and one end of the rectangular base, both removable wagon walls are pinned together to form a rectangular box opened at the top for holding articles, and removable wagon walls are repositioned and pinned on the wagons rectangular base ends to form a bench for sitting on.

3 Claims, 5 Drawing Sheets

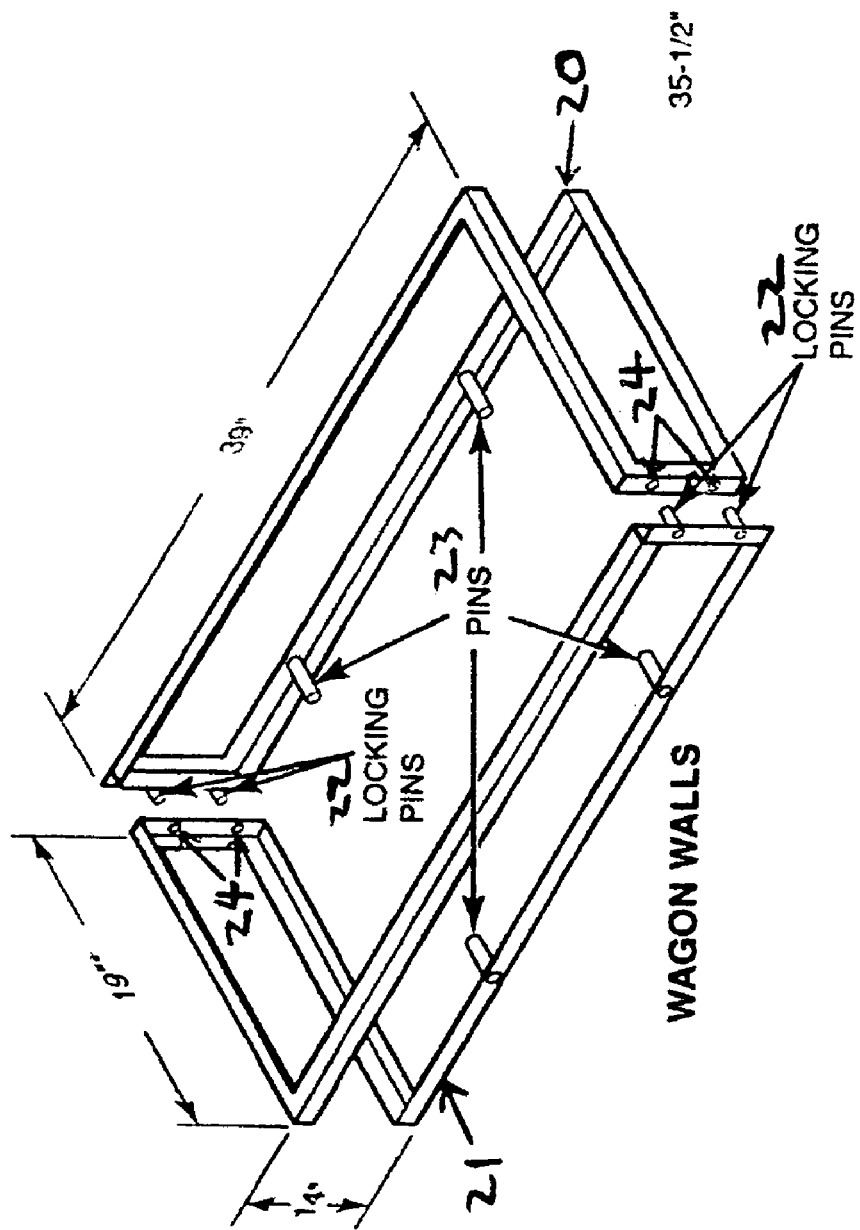

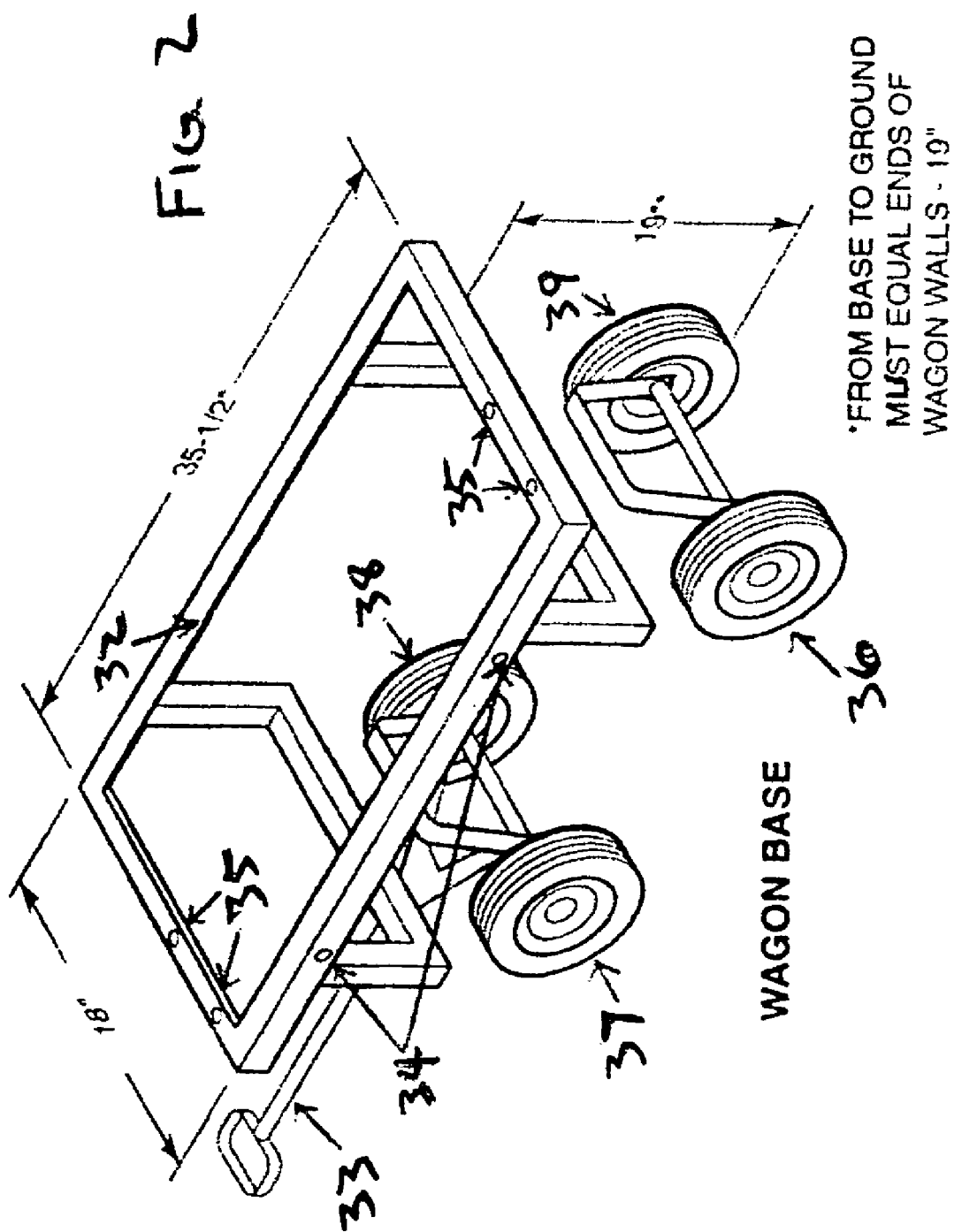

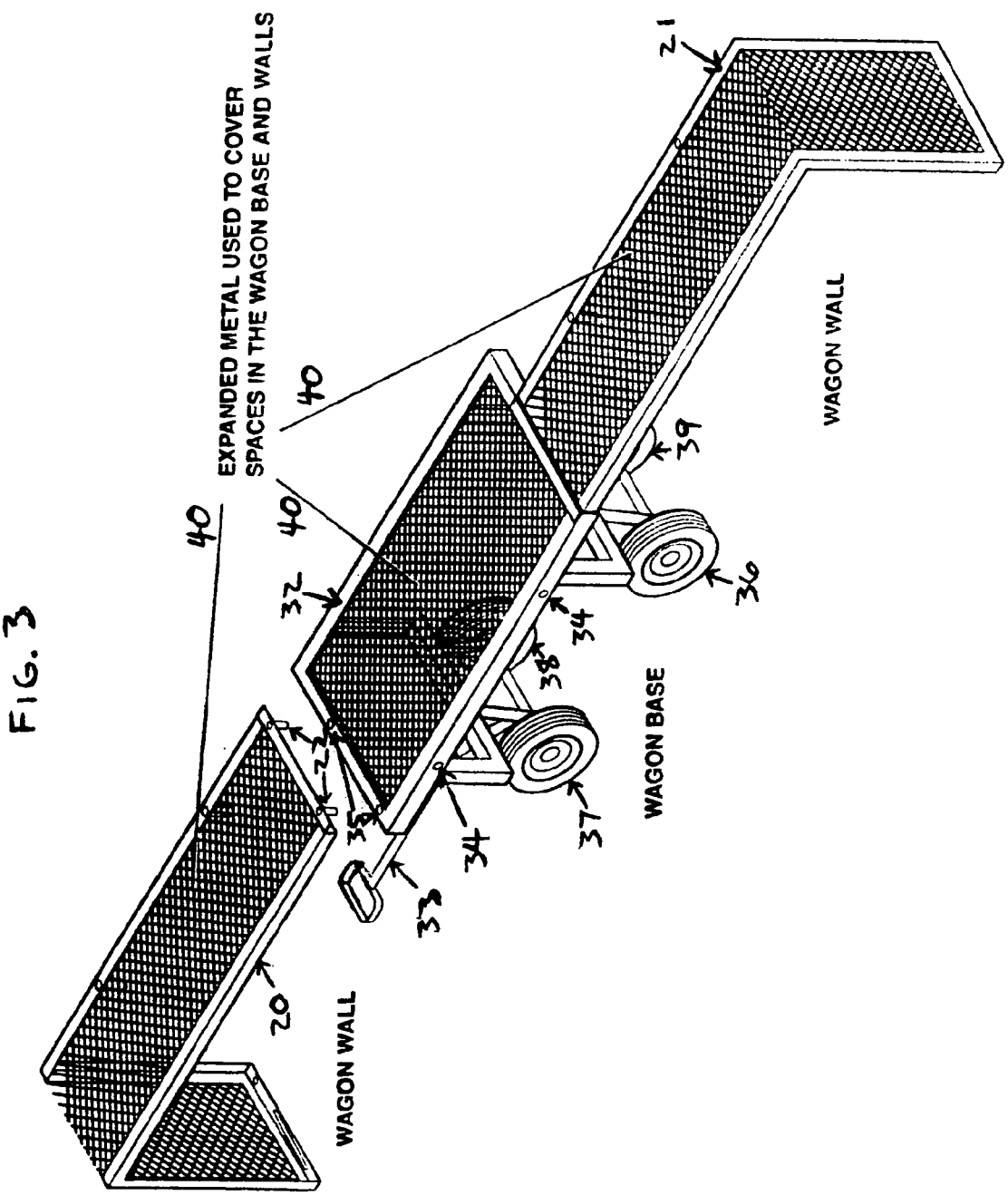

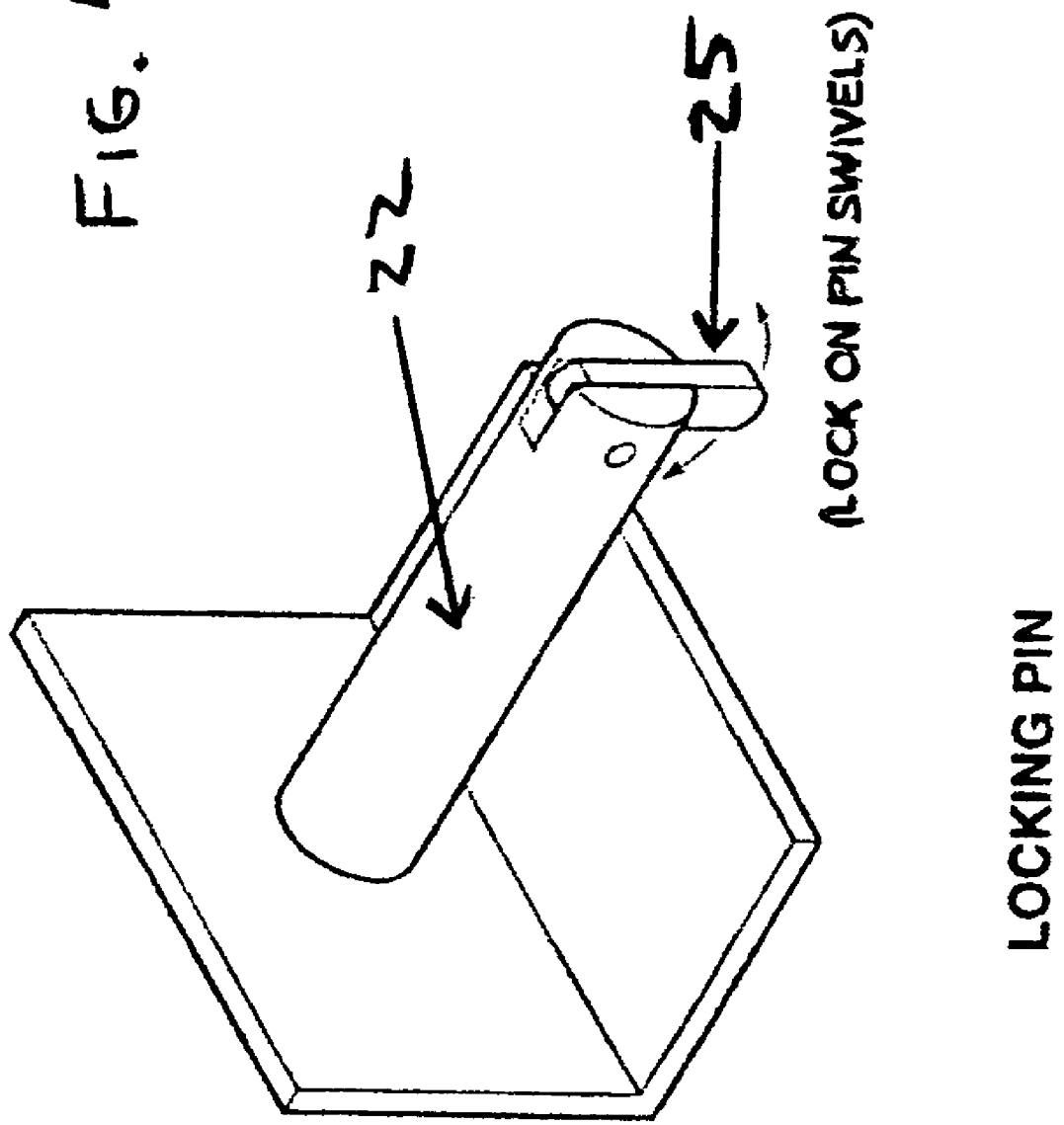

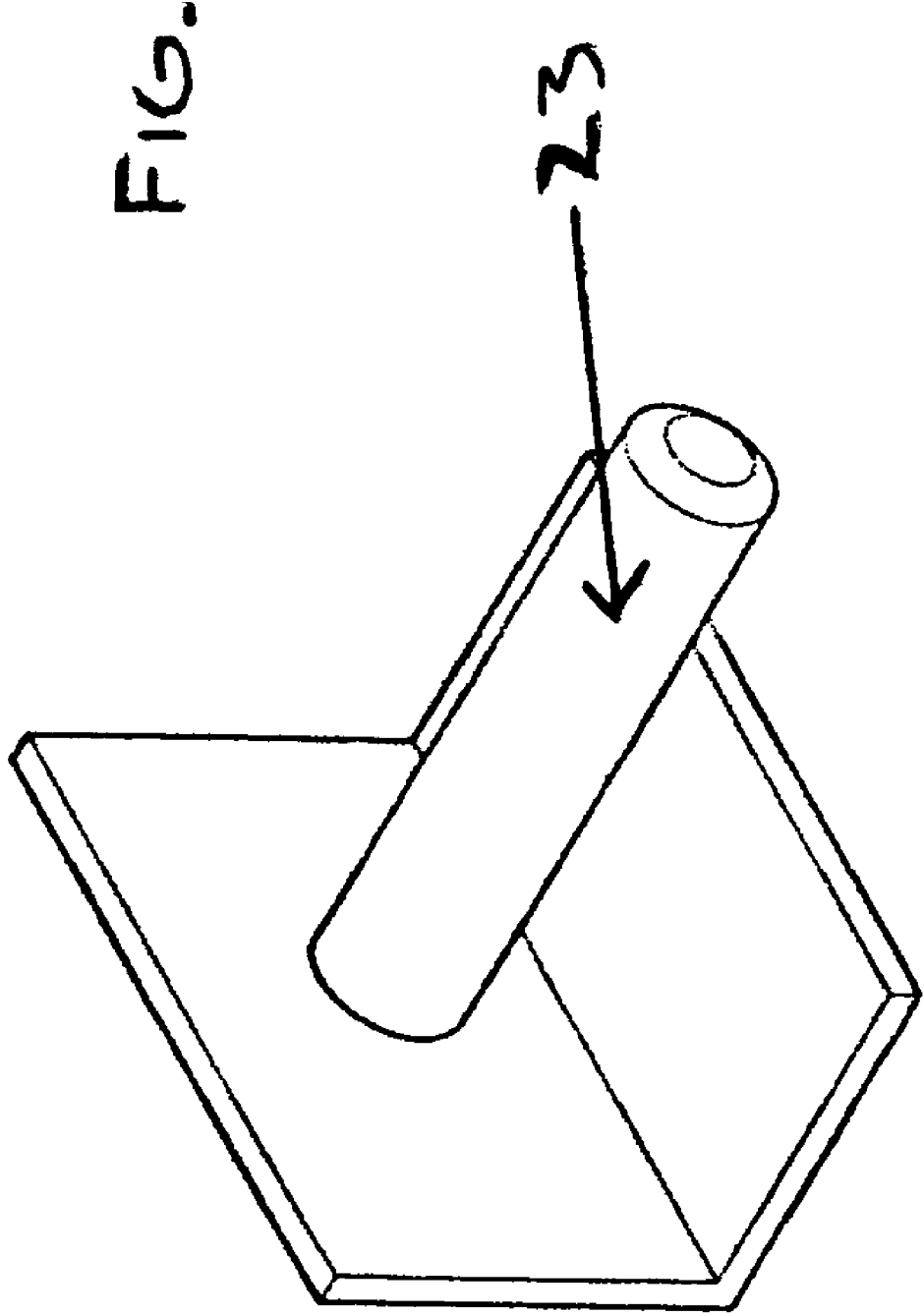

SPORT WAGON BENCH

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of sports and recreation and more specifically to a machine or wagon for carrying, holding and transporting articles that also can be transformed into a bench for sitting.

Wagons have been used for thousands of years. They have been used for carrying, holding and transporting many different items of all sizes and weights. Benches have also been used for thousands of years for people to sit on and as a place to put various things such as water jugs, etc.

There are patents for wagons that fold out into work tables. Also there are toy play wagons that have small seats inside the wagon for small children to sit on. There are many ideas of portable benches with wheels used for team sports such as soccer. The wheels make it easier to move the benches to the fields from the owners cars. These ideas would be the closest idea to my invention.

The main problem with other mobile benches for sports teams is that is all they are. Benches. While some make it easier using wheels to take the bench from the owners car in the parking lot to a sports field usually far away, most of them are still heavy, bulky and too big to fit in a standard van or sports utility vehicle (suv). People still have to hand carry or use a wagon to transport other articles to the sport fields such as water coolers, ice chests, sport equipment, etc.

My invention is a wagon that is small and light enough to fit into a van or suv and still big enough to carry water coolers, ice chests, sports equipment or anything else that is needed. After transporting the items to the sport fields, the wagon walls can be removed and repositioned on the wagon's rectangular base ends to convert it into a sports team bench for the players or spectators to sit on. This solves two problems with one invention. A wagon that is used for carrying, holding and transporting articles and that can also convert into a sports team bench to sit on.

BRIEF SUMMARY OF THE INVENTION

The primary object of the invention is To provide a wagon for transporting articles.

Another object of the invention is to provide a wagon for carrying articles.

Another object of the invention is to provide a wagon for holding articles.

A further object of the invention is to provide a wagon that converts into a bench for people to sit on.

Yet another object of the invention is to provide a wagon that can be made of steel, aluminum or plastic.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine or wagon for carrying, holding and transporting articles that also can be transformed into a bench for sitting. comprising: a rectangular base, four wheels mounted on the bottom of the base, two of the four wheels are pivotal with a handle to pull and steer the wagon. Two removable wagon walls that mount on the rectangular base, each removable wagon wall mounts on one side and one end of the rectangular base opposite of each other. Both removable wagon walls are pinned together to form a rectangular box opened at the top for holding articles. The same removable wagon walls can be repositioned and pinned on the wagons rectangular base ends to form a bench for sitting on.

BRIEF DESCRIPTION OF THE DRAWINGS

FIG. 1 is a perspective view of the walls of the wagon.

FIG. 2 is a perspective view of the rectangular base of the wagon with four wheels, two of the wheels pivot and have a handle for steering.

FIG. 3 is a perspective view of the wagon with the walls repositioned and mounted to the base ends to form a bench.

FIG. 4 is a detailed drawing of a locking pin that has a flat piece that swivels on the pin for locking purposes.

FIG. 5 is a detailed drawing of a pin with no lock used for joining the walls of the wagon to the wagon base.

A wagon constructed in accordance with the present invention is illustrated in FIG. 3. The wagon includes two separate wagon walls 20 and 21 in FIG. 1. Each wagon wall has two pins 23, which insert into retaining holes 34 in FIG. 2. Each wall also includes two locking pins 22 that insert into retaining holes 24 in FIG. 1 when used as a wagon and also insert into the retaining holes 35 in FIG. 2 when used as a bench.

In FIG. 2 the wagons rectangular base 32 is drawn. The base includes four wheels 36, 37, 38 and 39. The wheels 37 and 38 are pivotal and have a handle 33 for steering and pulling. Again, the rectangular base 32 has pin holes 34 and locking pin holes 35 for inserting the pins 23 and the locking pins 22 from FIG. 1, to secure and hold in position the wagon walls 20 and 21 when using the invention either as a wagon or a bench.

FIG. 3 is a perspective view of the wagon when it is converted into a bench. The wagon walls 20 and 21 are joined to the wagon base 32, by inserting the locking pins 22 into the retaining holes 35. Expanded metal or plastic 40 is used to complete the wagon walls 20 and 21 and also the wagons base 32 so the wagon can hold articles or be used to sit on as a bench. FIG. 3 also shows the four wheels 36, 37, 38, 39 and the handle 33 used for pulling and steering.

In FIG. 4, a detailed drawing of the locking pin 22 is shown. The locking pin 22 has a flat piece 25 attached to the pin that can swivel to lock the pin in a retaining hole so it can be secured to the other piece it is mounted to.

In FIG. 5, a detailed drawing of the pin 23 with no lock on it is shown. This pin 23 is used to insert into a retaining hole to hold and support the wagon walls when used as a wagon.

DETAILED DESCRIPTION OF THE PREFERRED EMBODIMENTS

Detailed description of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed systems, structure or manner.

The machine is basically a wagon with four wheels, two which are pivotal with a handle for pulling, used for carrying, holding and transporting various articles.

What is new about this wagon is that the walls can be removed and repositioned onto the base of the wagon which transforms it into a bench to be used for people to sit on.

The wagon walls have both pins and locking pins on them which are inserted into the appropriate holes to hold and lock in place the walls to form either the wagon or the bench, whichever is needed.

The advantages of this invention is that it can be used to hold, carry and transport various articles with great ease and then the articles can be removed from the wagon and the removeable walls can be repositioned on the wagon base ends to transform it into a bench so people can sit on.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A wagon frame comprising:
   a rectangular base for holding and transporting articles that can be transformed into a bench for sitting; said rectangular base including two ends,
   four wheels mounted on the bottom of the rectangular base; wherein two of the four wheels are pivotable with a handle attached to pull and steer said wagon; and
   two removable wagon walls that mount on to the rectangular base; each removable wagon wall mounts on one side and one end of said rectangular base;
   said two removable wagon walls are pinned together to form a rectangular box opened at said top for holding articles; and
   wherein said removable wagon walls are capable of being repositioned and pinned on said two ends of said rectangular base to form a bench for sitting on.

2. The wagon frame of claim 1, further comprising locking pins.

3. The wagon frame of claim 2 wherein said locking pins include a flat piece that is capable of swiveling into a locking position.

* * * * *